United States Patent [19]

Stapel

[11] Patent Number: 5,067,057
[45] Date of Patent: Nov. 19, 1991

[54] MULTIPLE PARABOLA LICENSE PLATE LAMP

[75] Inventor: William C. Stapel, Dearborn, Mich.

[73] Assignee: Ford Motor Company, Dearborn, Mich.

[21] Appl. No.: 661,967

[22] Filed: Feb. 28, 1991

[51] Int. Cl.$^5$ .............................................. B60Q 1/56
[52] U.S. Cl. ................................. 362/83.2; 362/304; 362/346; 40/204
[58] Field of Search ................. 362/28, 97, 98, 99, 362/83.2, 297, 304, 346, 347, 348, 812; 40/204, 205, 556

[56] References Cited

U.S. PATENT DOCUMENTS

| | | |
|---|---|---|
| 1,367,961 | 2/1921 | Grisby . |
| 1,402,479 | 1/1922 | Causon . |
| 1,567,193 | 12/1925 | Ritz-Woller . |
| 1,636,272 | 7/1927 | Aldridge . |
| 1,795,940 | 3/1931 | Falge . |
| 2,180,754 | 11/1939 | Checkos . |
| 2,454,722 | 11/1948 | Slamka ................................. 40/130 |
| 3,064,378 | 11/1962 | Onksen ................................. 40/204 |
| 3,828,178 | 8/1974 | Bickel .............................. 240/7.1 R |
| 3,885,145 | 5/1975 | Wise ..................................... 362/99 |

*Primary Examiner*—Stephen F. Husar
*Attorney, Agent, or Firm*—Paul K. Godwin, Jr.; Clifford L. Sadler

[57] ABSTRACT

A lamp assembly which utilizes a plurality of concave reflector elements to direct light to prescribed areas of an associated panel, such as a license plate.

12 Claims, 2 Drawing Sheets

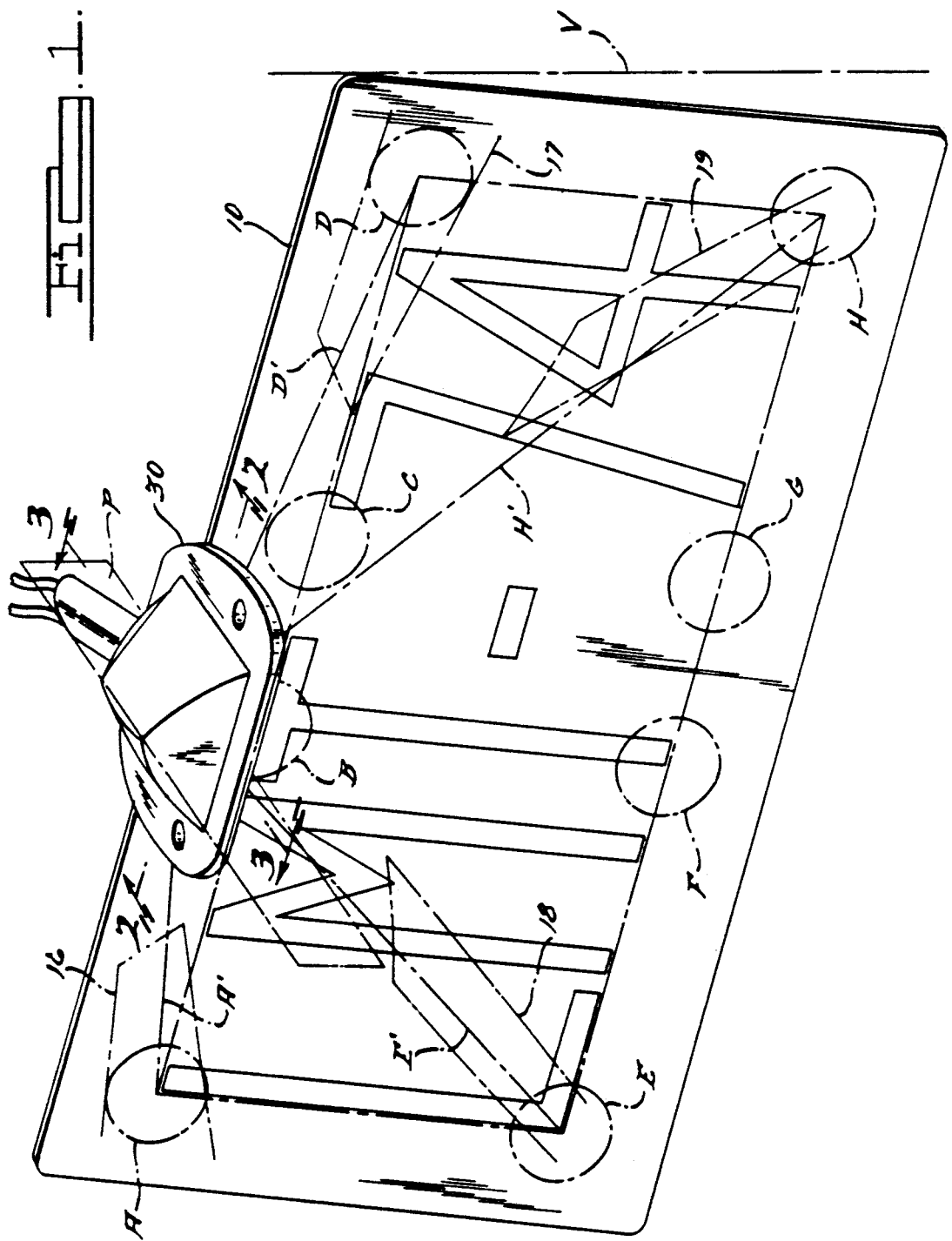

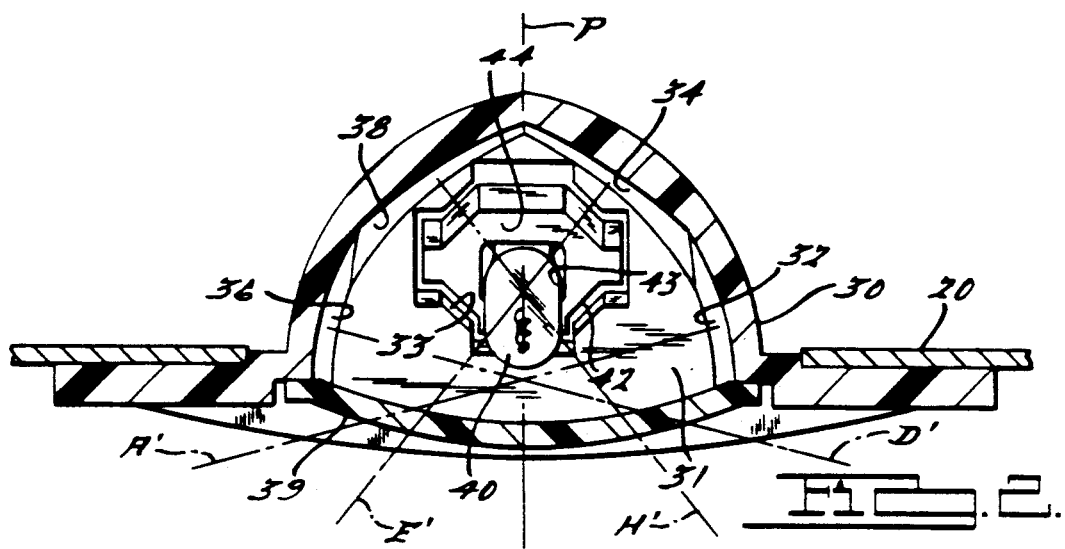
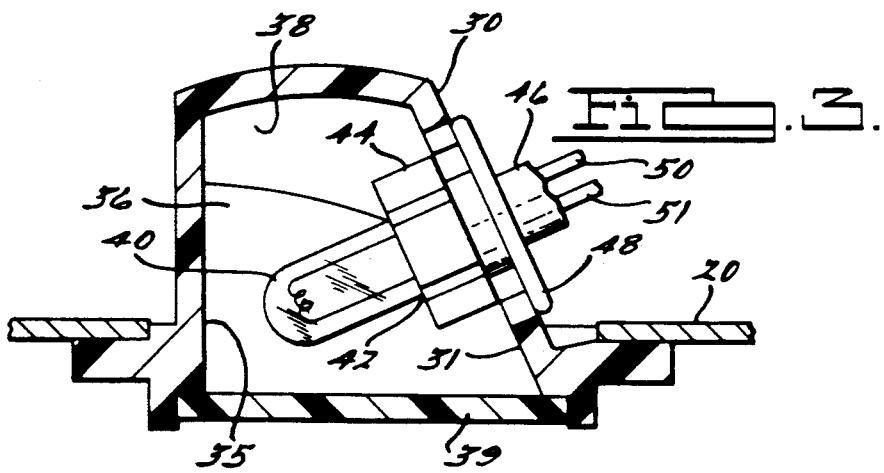
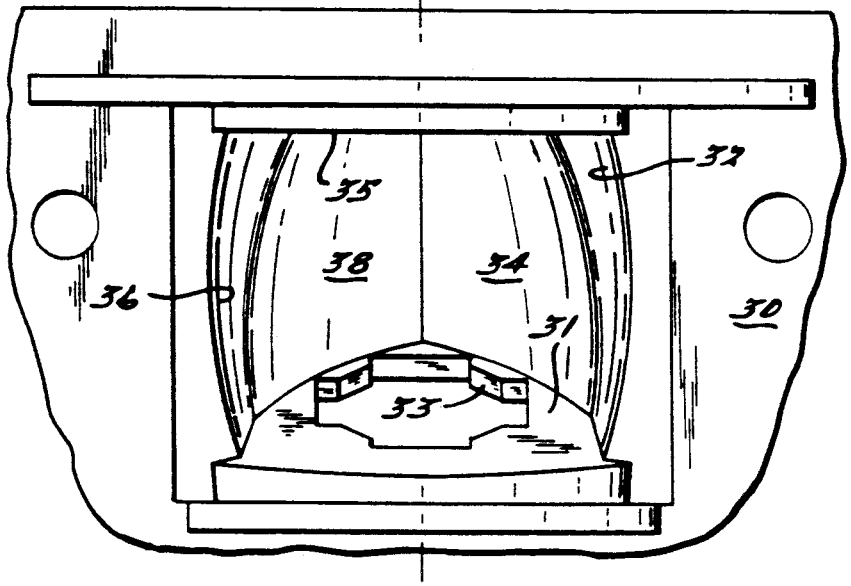

MULTIPLE PARABOLA LICENSE PLATE LAMP

BACKGROUND OF THE INVENTION

1. Field of the Invention

The present invention is directed to the field of lamp assemblies and more specifically to such assemblies that are used in conjunction with license plate panels for illuminating surfaces of such panels.

2. Description of the Prior Art

A lamp assembly that is used to illuminate the surface of a flat panel, such as a license plate on an automotive vehicle, generally includes a reflective housing with an aperture for accepting a light bulb socket assembly and a lens element for allowing light to escape from the lamp assembly in various directions toward the front surface of the license plate. Such assemblies are generally effective for illuminating portions of the panel with varying intensities. The highest intensity of illumination usually occurs just adjacent to the lamp assembly, and the remote areas of the panel receive significantly less illumination.

U.S. Government regulations for illuminating license plates are expressed in Federal Motor Vehicle Safety Standards (FMVSS). Those standards mandate that eight test points on the plate be illuminated so that the ratio of illumination intensity measured at the two highest and the two lowest test points must not exceed 20:1 and that the minimum illumination per test point must be at least 0.75 Ft-c.

In order to comply with the standard, vehicle manufacturers generally use one of two approaches. The first approach uses two lamp assemblies to illuminate the license plate. In the two lamp assembly approach, the lamp assemblies are usually mounted above the top edge of license plate so that they will illuminate respective halves of the plate. The two lamp assemblies may also be mounted at opposite ends of the plate and direct light toward the center.

The second approach uses a single bulb lamp assembly, with a curved Fresnel lens mounted above or below the center of the plate to effect the distribution of light in a prescribed pattern. However, the second approach requires a relatively high intensity bulb to achieve the required illumination intensity.

SUMMARY OF THE INVENTION

The present invention achieves the goal of meeting the FMVSS standards with a single bulb by forming the body of a lamp assembly reflector to have several parabolic surfaces. Each of the symmetrically disposed parabolic reflective surfaces is commonly focused on the bulb filament and is oriented to direct light to the most remote test points on the associated license plate. In this manner, the light intensity at each of those remote test points is significantly increased over single bulb lamp assemblies of the prior art and improves the ratio between the high and low intensity test points. The parabolic reflective surfaces of the lamp assembly housing provide efficient light handling and, therefore, allow for use of a relatively low candle power bulb to achieve the desired results.

It is, therefore, an object of the present invention to derive a low cost lamp assembly having a reflector housing formed in a predetermined manner to efficiently direct the light received directly from a single bulb to specific remote regions of an associated license plate.

It is another object of the present invention to provide a license plate lamp assembly which is capable of being positioned relative to an automotive license plate and meeting the FMVSS requirements with a single and relatively low candle power bulb.

BRIEF DESCRIPTION OF THE DRAWINGS

FIG. 1 is a perspective view of the lamp assembly of the present invention spatially positioned with respect to the license plate panel it is intended to illuminate.

FIG. 2 is a cross section of the lamp assembly shown in FIG. 1 taken along the lines 2—2.

FIG. 3 is a cross sectional view of the lamp assembly shown in FIG. 1 taken along lines 3—3.

FIG. 4 is a bottom of the lamp assembly shown in FIGS. 1-3 with the lens element 39 removed.

DETAILED DESCRIPTION OF THE PREFERRED EMBODIMENT

In FIG. 1, the lamp assembly 30 which embodies the present invention is shown oriented to illuminate a planar panel 10. In this instance, the planar panel 10 is a license plate mounted on a vehicle and slightly inclined with respect to a vertical reference plane B.

Under FMVSS regulations, license plate 10 is approximately 12 inches long and 6 inches high. Test point target areas A, B, C, D, E, F, G and H are proscribed as being approximately one inch in diameter. Remote test areas A, D, E and H are located on centers that are spaced on inch from each corner. Test areas B, C, F and G are located one inch from the center line and the top and bottom edges.

Lamp assembly 30 is configured to direct light from a single light source along axes A', D', E' and H in order to increase the intensity of illumination at the remote test points A, D, E and H, respectively. This is achieved through a unique reflector having which is better understood by viewing FIGS. 2-4.

In FIGS. 2 and 3, the lamp assembly 30 is shown in cross sectional detail mounted on a body panel portion 20 of an associated vehicle. The lamp assembly 30 includes at least four distinct parabolic reflective surface segments 32, 34, 36 and 38 integrally formed and symmetrically disposed about a defined central plane P, as the inner portion of the housing. The parabolic reflective surfaces 32, 34, 36, and 38 are formed to have a common focal point which coincides with the position of a light source 40. In this case, light source 40 is an incandescent bulb having a filament which extends through the common focal point of the parabolic reflecting surfaces. These surfaces provide first surface reflectors of light along respective image axes A', E', D' and H'. The bulb 40 is mounted within a socket 43 in a bulb holder 44. The bulb holder 44 is configured and coded to correspond with the opening 33 in the rear wall 31 of lamp housing 30 opposite a front wall 35. When inserted and twisted into position, the lamp housing 30 seals the aperture 33 to prevent dirt and moisture from entering the housing through the opening 33. Lens element 39 is shown as placed over the light emitting opening of the housing 30 in order to protect the bulb from physical damage and to prevent dirt and moisture from entering the housing. The lens element 39 may be clear for transmitting the light without significant refraction, or it may be constructed to either diffuse the light or assist in the focusing of the light emitted from the housing.

Referencing back to FIG. 1, the effect of the four parabolic reflector surface segments in the housing 30 is to direct and enhance the light intensity at image fields 16, 17, 18 and 19 which overlap the respective target areas A, D, E, and H. The proscribed central target areas B, C, F and G are illuminated in a floodlit manner with light emitted directly from the bulb 40 and that which is first reflected from surfaces of rear wall 31 and front wall 35 through the lens element 39. The end result is that the illumination per test point exceeds the 0.75 Ft-c requirement; and, more importantly, the distribution of light on the panel is such that the ratio between the two highest and the two lowest test points falls well below the 20:1 requirement It will be apparent that many modifications and variations may be implemented without departing from the scope of the novel concept of this invention. Therefore, it is intended by the appended claims to cover all such modifications and variations which fall within the true spirit and scope of the invention.

I claim:

1. A lamp assembly for use in conjunction with a rectangular panel for illuminating a defined front surface of said panel from a location that is slightly forward and to one side of said panel, comprising:
   a reflector housing having an opening oriented towards said panel and containing a plurality of parabolically curved first surface reflectors with a common focal point and separately oriented imaging fields;
   an incandescent light source located within said housing at the common focus of said plurality of reflectors; and
   a lens element attached to said housing and covering said opening.

2. A lamp assembly as in claim 1, wherein said reflector housing contains at least four parabolically curved surfaces disposed symmetrically about a defined center plane that when extended is substantially normal to the surface of said panel.

3. A lamp assembly as in claim 2, wherein said reflector surfaces are oriented to direct light from said source and incident thereon to different areas of said panel and said lens is configured to diffuse the light from the assembly including the light emitted directly from said source.

4. A lamp assembly as in claim 3, wherein said panel is a license plate for an automotive vehicle and said assembly is centrally located adjacent the longest edge of said panel to provide symmetric distribution of light across said panel with enhanced distribution in areas within each parabolic reflector imaging field.

5. A lamp assembly as in claim 1, wherein said reflector surfaces are oriented to direct light from said source and incident thereon to different areas of said panel and said lens is configured to diffuse the light from the assembly including the light emitted directly from said source.

6. A lamp assembly as in claim 1, wherein said panel is a license plate for an automotive vehicle and said assembly is centrally located adjacent the longest edge of said panel to provide symmetric distribution of light across said panel with enhanced distribution in areas within each parabolic reflector imaging field.

7. A license plate lamp assembly for use on an automotive vehicle to provide enhanced light distribution to four corner target areas on the license plate, comprising:
   a housing which contains a bulb socket, a concave reflector and light emitting opening;
   an incandescent bulb mounted in said socket within said housing to emit light towards said concave reflector and towards said light emitting opening;
   said concave reflector including four parabolic segments having a common focal point that is coincident with the location of the bulb filament and each segment oriented to direct the light incident thereon from said filament through said housing opening and onto separate areas of said license plate that correspond to said corner target areas.

8. A license plate lamp assembly as in claim 7, wherein said light emitting opening allows light directly from said filament to illuminate the remainder of said license plate.

9. A license plate lamp assembly as in claim 8, wherein said light emitting opening is covered with a lens element.

10. A license plate lamp assembly as in claim 9, wherein said lens element is transparent.

11. A license plate lamp assembly as in claim 9, wherein said lens element diffuses the light passing through it.

12. A license plate lamp assembly as in claim 9, wherein said lens element contains refracting portions which spread the light directed therethrough in a predetermined distribution concentration.

* * * * *